(12) United States Patent
Lee et al.

(10) Patent No.: US 12,532,950 B2
(45) Date of Patent: Jan. 27, 2026

(54) ELECTRONIC DEVICE CAPABLE OF BEING HELD IN LANDSCAPE AND PORTRAIT DIRECTIONS, AND ELECTRONIC DEVICE COVER

(71) Applicant: SAMSUNG ELECTRONICS CO., LTD., Suwon-si (KR)

(72) Inventors: Sangyup Lee, Suwon-si (KR); Hyunwoo Kwon, Suwon-si (KR); Huijun Ahn, Suwon-si (KR); Sangjae Jung, Suwon-si (KR); Jiwoo Lee, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 312 days.

(21) Appl. No.: 18/222,032

(22) Filed: Jul. 14, 2023

(65) Prior Publication Data

US 2023/0363505 A1 Nov. 16, 2023

Related U.S. Application Data

(63) Continuation of application No. PCT/KR2021/018853, filed on Dec. 13, 2021.

(30) Foreign Application Priority Data

Jan. 14, 2021 (KR) .......................... 10-2021-0005448

(51) Int. Cl.
*A45C 11/00* (2006.01)
*H04M 1/04* (2006.01)

(52) U.S. Cl.
CPC .............. *A45C 11/00* (2013.01); *H04M 1/04* (2013.01); *A45C 11/002* (2025.01); *A45C 11/003* (2025.01)

(58) Field of Classification Search
None
See application file for complete search history.

(56) References Cited

U.S. PATENT DOCUMENTS 9,226,559 B1 1/2016 Diebel et al.
9,762,279 B2 9/2017 Lee et al.
(Continued)

FOREIGN PATENT DOCUMENTS

CN 204129569 U 1/2015
JP 3178092 U 8/2012
(Continued)

OTHER PUBLICATIONS

Korean Office Action corresponding to Application No. 10-2021-0005448; Dated Feb. 4, 2025.
(Continued)

*Primary Examiner* — Parul H Gupta
(74) *Attorney, Agent, or Firm* — CANTOR COLBURN LLP

(57) ABSTRACT

An electronic device capable of being held in both a landscape and a portrait direction, and an electronic device cover for holding the electronic device in landscape and portrait directions, is provided. The electronic device cover and the electronic device comprise: a first plate; a hinge connected to the first plate and having resistance to rotation with respect to at least one rotation angle; and a second plate, which has one side rotatably connected to the first plate by means of the hinge, wherein the second plate may include a trapezoidal main plate having, as a base, the side of the second plate connected to the hinge, and a folding part connected to the main plate and folded in the planar direction of the second plate at a constant angle with respect to the short side of the second plate.

12 Claims, 12 Drawing Sheets

(56) References Cited

U.S. PATENT DOCUMENTS

| | | | |
|---|---|---|---|
| 2008/0058038 A1* | 3/2008 | Murdoch | H04M 1/0218 |
| | | | 455/575.3 |
| 2010/0085274 A1 | 4/2010 | Kilpatrick, II et al. | |
| 2015/0313033 A1 | 10/2015 | Lee et al. | |
| 2015/0316999 A1 | 11/2015 | Harms et al. | |
| 2016/0286954 A1 | 10/2016 | Wu et al. | |
| 2017/0168524 A1 | 6/2017 | Kim et al. | |
| 2020/0121045 A1* | 4/2020 | Buechin | A45C 11/00 |
| 2020/0121046 A1* | 4/2020 | Buechin | A45C 11/00 |
| 2022/0043481 A1* | 2/2022 | Shin | G06F 1/1652 |

FOREIGN PATENT DOCUMENTS

| | | |
|---|---|---|
| KR | 20110052743 A | 5/2011 |
| KR | 20130002292 U | 4/2013 |
| KR | 20130002371 U | 4/2013 |
| KR | 101319255 B1 | 10/2013 |
| KR | 200471146 Y1 | 2/2014 |
| KR | 20170070737 A | 6/2017 |

OTHER PUBLICATIONS

International Search Report and Written Opinion for International Application No. PCT/KR2021/018853; International Filing Date Dec. 13, 2021 ; Date of Mailing Mar. 21, 2022; 5 Pages.

* cited by examiner

ELECTRONIC DEVICE CAPABLE OF BEING HELD IN LANDSCAPE AND PORTRAIT DIRECTIONS, AND ELECTRONIC DEVICE COVER

CROSS-REFERENCE TO RELATED APPLICATIONS

This application is a continuation of International Application No. PCT/KR2021/018853, designating the United States, filed on Dec. 13, 2021, in the Korean Intellectual Property Receiving Office and claiming priority to Korean Patent Application No. 10-2021-0005448, filed on Jan. 14, 2021 in the Korean Intellectual Property Office, the disclosures of which are incorporated by reference herein in their entireties.

TECHNICAL FIELD

Various embodiments disclosed in this document relate to an electronic device capable of being mounted in a landscape orientation and a portrait orientation, and a cover for an electronic device capable of mounting the electronic device in both the landscape orientation and the portrait orientation.

BACKGROUND ART

A portable electronic device may be provided with a cover to protect it from external hazards such as drops, collisions, and scratches. The cover is generally provided as a holder and cover configured not only to protect the portable electronic device, but also to be used as a supporting cradle when the portable electronic device is used in a mounted state.

In addition, for using a portable electronic device having a display, such as a smartphone, tablet computer, and portable monitor, in a mounted state, depending on the nature of content presented on the display and the type of work to be performed, it is necessary to mount the portable electronic device in a landscape or portrait orientation based on the long side or short side of the display. For example, working efficiency can be increased by mounting the portable electronic device in the landscape orientation for a task such as video playback and in the portrait orientation for a task such as document reading and editing.

Unfortunately, current holder and cover products generally have a configuration suitable only for the landscape orientation of a tablet computer. For example, some holders and covers are configured to be supported by fixing the long side of the holder or cover to the ground. Such products are not well-suited to use in a portrait orientation because, when the short side of the cover is fixed to the ground to support a portable electronic device that is mounted vertically with respect to the ground, the device cannot be mounted with a viewing angle suitable for use. Moreover, there is a risk of damage due to the electronic device tipping over.

Disclosure of Invention

Various embodiments disclosed in this document may provide a cover for an electronic device designed to be folded as a cradle that can hold the electronic device in both a landscape orientation and a portrait orientation, and an electronic device having a cradle designed to be foldable for horizontal and vertical mounting.

A cover for an electronic device according to embodiments of the disclosure may include: a first plate; a hinge connected to the first plate and configured to have resistance to rotation at at least one rotational angle; and a second plate having one side rotatably connected to the first plate through the hinge. The second plate may include a trapezoid-shaped main plate having a side connected to the hinge as a base, and a folding part connected to the main plate and being foldable alone a fold line while forming a specific angle with a short side of the second plate.

In other embodiments, the folding part may include a flap, and the fold line connects the main plate and the flap in a foldable manner and forms a specific angle with respect to a short side of the main plate. In other embodiments, the folding part may include two layers of flaps, and each of the flaps may be connected to the main plate by a fold line so as to be foldable in an outward direction with respect to both surfaces of the second plate.

In other embodiments, the folding part may include two layers of first flaps, a first fold line connecting each of the first flaps to the main plate in a foldable manner, two layers of second flaps connected respectively to the first flaps, and a second fold line connecting the second flaps to the first flaps in a foldable manner. When the electronic device is mounted in portrait orientation, the first flaps are folded in an outward direction with respect to both surfaces of the second plate, and the second flaps are folded in an inward direction, making a squash fold. In some embodiments, the second plate may have a two-layer structure formed by folding a plate, parts of the two-layer structure may be bonded to each other, and the folding part may be made of parts that are not bonded in the two-layer structure.

In some embodiments, the cover for the electronic device may include a detachable coupling member for coupling the first flaps and the second flaps. In some embodiments, the detachable coupling member may include magnets, and the magnets may be disposed on surfaces of the first flaps and the second flaps in contact with each other such that the N pole and the S pole face each other.

In some embodiments, the hinge may be a torque hinge that provides a frictional force against rotation of the hinge. In other embodiments, the hinge may be a detent hinge having characteristics where the resistance to rotational action is increased at at least one specific rotational angle. In other embodiments, the detent hinge may include a hinge shaft and a hinge knuckle having a shaft hole through which the hinge shaft passes, and the hinge shaft and the shaft hole may each have a cross section of a D-cut shape being a shape cut along at least one chord from a circle, so that the resistance to rotational action may be increased at a rotational angle of the hinge where the chord of the hinge shaft and the chord of the shaft hole coincide.

In some embodiments, the detent hinge includes a hinge shaft and a hinge knuckle having a shaft hole through which the hinge shaft passes, the hinge shaft having a polygonal cross-sectional area and the shaft hole in the hinge knuckle having a cross-sectional shape configured to accommodate a shape of the polygonal cross-sectional area of the hinge shaft such that the detent hinge provides resistance to rotation at a plurality of rotational angles equal to a number of sides of the hinge shaft.

An electronic device capable of being mounted in both a landscape orientation and a portrait orientation according to other embodiments of the disclosure may include: a first plate positioned on a rear surface part of the electronic device; a hinge connected to the first plate and configured to have resistance to rotation at at least one rotational angle; and a second plate rotatably connected to the first plate through the hinge. In some embodiments, the second plate may include a trapezoid-shaped main plate having a side connected to the hinge as a base, and a folding part connected to the main plate and being foldable along a fold line while forming a specific angle with respect to the short side of the second plate. In some embodiments, the folding part may include a flap, and the fold line is formed to connect the main plate and the flap in a foldable manner and to provide a specific angle with the short side of the main plate. In some embodiments, the folding part may include two layers of flaps, and each of the flaps may be connected to the main plate through the folding part so as to be foldable in an outward direction with respect to both surfaces of the second plate.

In other embodiments, the folding part may include two layers of first flaps, a first fold line connecting the first flaps to the main plate in a foldable manner, two layers of second flaps connected respectively to the first flaps, and a second fold line connecting the second flaps to the first flaps in a foldable manner. When the electronic device is mounted in portrait orientation, the first flaps are folded in an outward direction with respect to both surfaces of the second plate, and the second flaps are folded in an inward direction, making a squash fold. In some embodiments, the second plate may have a two-layer structure formed by folding a plate, parts of the two-layer structure may be bonded to each other, and the folding part may be made of parts that are not bonded in the two-layer structure.

In some embodiments, the electronic device may include a detachable coupling member for coupling the first flaps and the second flaps. In some embodiments, the detachable coupling member may include magnets, and the magnets may be disposed on surfaces of the first flaps and the second flaps in contact with each other such that the N pole and the S pole face each other.

In some embodiments, the hinge may be a torque hinge that provides a frictional force against rotation of the hinge. In other embodiments, the hinge may be a detent hinge having characteristics where the resistance to rotational action is increased at at least one specific rotational angle. In other embodiments, the detent hinge may include a hinge shaft and a hinge knuckle having a shaft hole through which the hinge shaft passes, and the hinge shaft and the shaft hole may each have a cross section of a D-cut shape being a shape cut along at least one chord from a circle, so that the resistance to rotational action may be increased at a rotational angle of the hinge where the chord of the hinge shaft and the chord of the shaft hole coincide.

In some embodiments, the detent hinge includes a hinge shaft and a hinge knuckle having a shaft hole through which the hinge shaft passes, the hinge shaft having a polygonal cross-sectional area and the shaft hole in the hinge knuckle having a cross-sectional shape configured to accommodate a shape of the polygonal cross-sectional area of the hinge shaft such that the detent hinge provides resistance to rotation at a plurality of rotational angles equal to a number of sides of the hinge shaft.

Advantageous Effects of Invention

According to various embodiments disclosed in this document, the folding part of a second plate supporting the electronic device with respect to the ground has a multi-layered structure including two foldable flaps overlapping each other, and the flaps may be folded with a fixed angle in an outward direction of the second plate to constitute a cradle, so that the electronic device can be held at a specific angle with respect to the ground. In this manner, the electronic device can be fully supported while in the landscape or portrait orientation with a lower risk of tipping over.

In addition, the second plate has a plurality of folding parts that are folded at different angles, so that the electronic device can be held at plural angles according to the usage environment and posture of the electronic device. In this manner, the electronic device can be positioned to provide any suitable viewing angle in both the landscape and portrait orientations.

BRIEF DESCRIPTION OF DRAWINGS

In connection with the description of the drawings, the same or similar reference symbols may be used for the same or similar elements.

MODE FOR THE INVENTION

Figure 1:
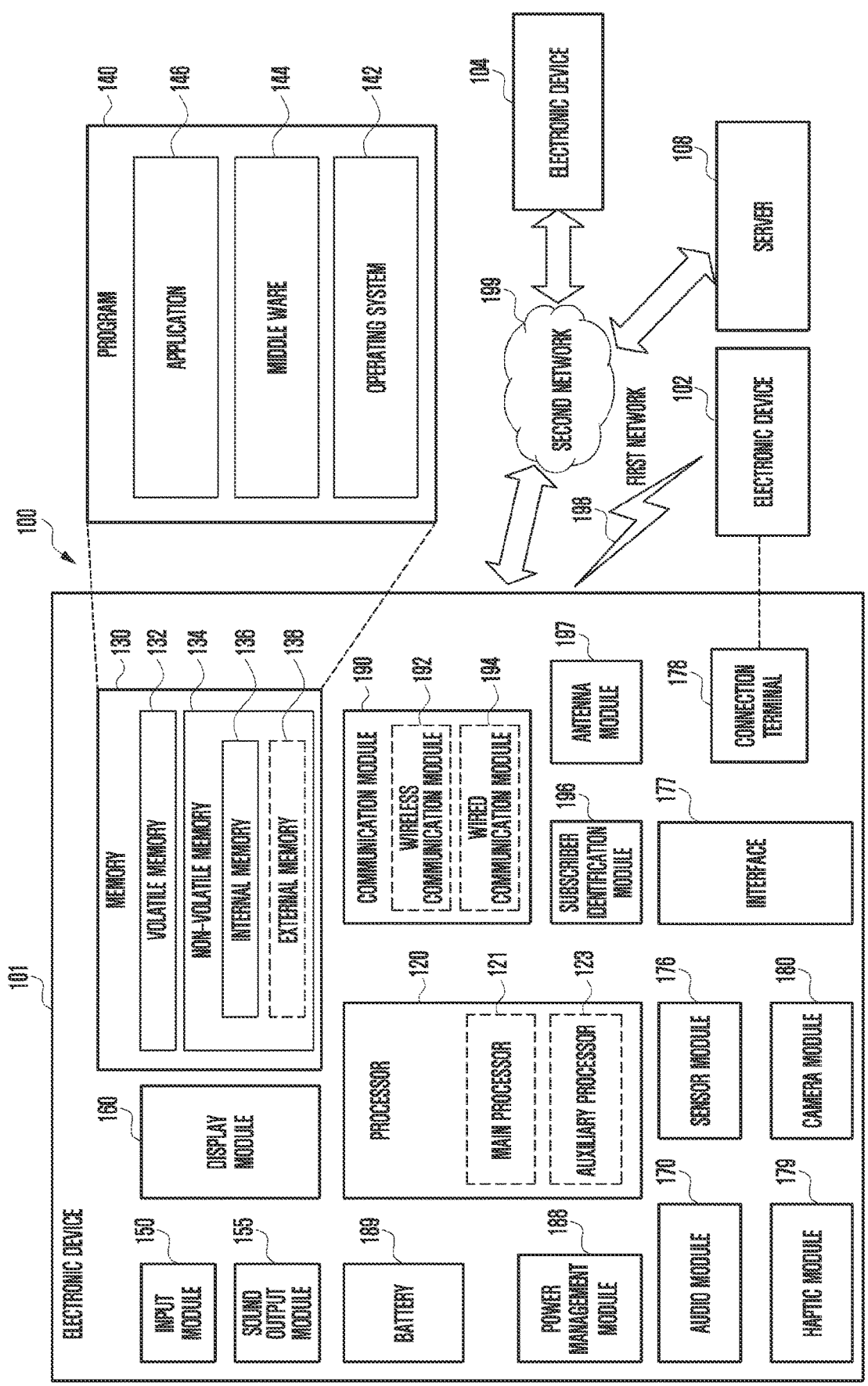
FIG. 1 is a block diagram of an electronic device 101 in a network environment 100 according to various embodiments.

Hereinafter, exemplary embodiments of the disclosure will be described in detail with reference to the accompanying drawings. In these drawings, the size and shape of elements may be exaggerated for convenience and clarity of explanation for example, and deformation of the illustrated shapes may be expected in actual implementation. Hence, embodiments of the present disclosure should not be construed as being limited to a specific shape of a region shown herein.

A reference symbol assigned to an element in the drawings refer to the same element throughout the drawings. Also, as used herein, the term "and/or" includes any one of the corresponding listed items and all combinations thereof.

The embodiments of the disclosure are provided to more completely explain the disclosure to those skilled in the art, the following embodiments may be modified in many different forms, and the scope of the disclosure is not limited to the following embodiments. Rather, these embodiments are provided to make the disclosure more thorough and complete, and to fully convey the spirit of the disclosure to those skilled in the art.

Terms used in this specification are used to describe the embodiments, and are not intended to limit the scope of the disclosure. In addition, the singular forms used herein are intended to include the plural forms as well, unless the context clearly indicates otherwise. Further, an expression "comprise" and/or "comprising" indicates the presence of the stated features, numbers, steps, operations, members, elements, or groups thereof, but does not preclude the presence or addition of other features, numbers, steps, operations, members, elements, or groups thereof.

In this specification, relative terms such as "below", "above", "upper", "lower", "horizontal" or "vertical" may be used to describe the relationship between one constituent member, layer or region and another constituent member, layer or region, as shown in the drawings. The x, y and z axes may be indicated on the drawing. In this case, "vertical" corresponds to the z axis on the drawing, and "horizontal" means being parallel to the plane formed by the x and y axes. However, it should be understood that these terms may encompass directions indicated in the drawings as well as other directions. Further, in this specification, the term "landscape orientation" or "portrait orientation" refers to, as an orientation of an electronic device having a rectangular display with a specific aspect ratio other than 1 and its ancillary materials, an orientation in which the long side or the short side of the display is disposed substantially parallel to the ground plane.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments disclosed herein can be one of various types of devices. The electronic devices may include, for example, portable communication devices (e.g., smartphones), computers, portable multimedia devices, portable medical instruments, cameras, wearable devices, or home appliances. The electronic device according to an embodiment of the present document is not limited to the above-mentioned devices.

It should be understood that the various embodiments of the present document and the terminology used therein are not intended to limit the technical features described herein to specific embodiments but to include various modifications, equivalents, and/or alternatives thereof. In connection with the description of the drawings, similar reference symbols may be used for similar or related components. The singular form of a noun corresponding to an item may include one or multiple instances of the item unless clearly indicated otherwise in a related context. In the present document, the expression "A or B", "at least one of A and B", "at least one of A or B", "A, B or C", "at least one of A, B and C", or "at least one of A, B or C" may include any one of the listed items or all possible combinations thereof. The terms "$1^{st}$" and "$2^{nd}$" or "first" and "second" may be used to simply distinguish one element from another element, without limiting corresponding elements in another aspect (e.g., importance or order). It will be understood that when an element (e.g., first element) is referred to as being "coupled with/to" or "connected with/to" another element (e.g., second element) with/without a term "operably" or "communicatively", it can be coupled or connected with/to the other element directly (e.g., wiredly), wirelessly, or via a third element.

The term "module" used in various embodiments of the present document may include a certain unit that is implemented in hardware, software, or firmware, and may be used interchangeably with the term "logic", "logical block", "component", or "circuit", for example. The module may be the minimum unit or a part of a single-bodied component, which performs one or more particular functions. For example, in an embodiment, a module may be implemented in the form of an application-specific integrated circuit (ASIC).

Various embodiments of the present document may be implemented in software (e.g., programs 140) including one or more instructions stored in a storage medium (e.g., internal memory 136 or external memory 138) readable by a machine (e.g., electronic device 101). For example, the processor (e.g., processor 120) of the machine (e.g., electronic device 101) may invoke and execute at least one of the one or more instructions stored in the storage medium. This enables the machine to be operated to perform at least one function according to the invoked at least one instruction. The one or more instructions may include a code generated by a compiler or a code executable by an interpreter. The machine-readable storage medium may be provided in the form of a non-transitory storage medium. Here, the term 'non-transitory' means that the storage medium is a tangible device and does not include a signal (e.g., electromagnetic wave), but it does not distinguish whether data is stored semi-permanently or temporarily in the storage medium.

According to an embodiment, the method according to various embodiments disclosed herein may be provided as being included in a computer program product. A computer program product may be traded between a seller and a purchaser as a commodity. A computer program product may be distributed in the form of a machine-readable storage medium (e.g., compact disc read only memory (CD-ROM)), or may be distributed online (e.g., download or upload) directly between two user devices (e.g., smartphones) or through an application store (e.g., PlayStore™). In the case of on-line distribution, at least a portion of the computer program product may be temporarily stored or temporarily created in a machine-readable storage medium such as a memory of a manufacturer's server, an application store's server, or a relay server.

According to various embodiments, each of the components (e.g., modules or programs) described above may include singular or plural entities, and some of the plural entities may be separately assigned to other components. According to various embodiments, one or more components or operations may be omitted from the corresponding components described above, or one or more different components or operations may be added. Alternatively or additionally, plural components (e.g., modules or programs) may be combined into one component. In this case, the combined component may perform one or more functions identical or similar to those of the plural components before combination. According to various embodiments, operations performed by a module, program, or another component may be carried out in sequence, in parallel, by repetition, or heuristically, and one or more of the operations may be executed in a different order or may be omitted, or one or more different operations may be added.

Figure 2A:
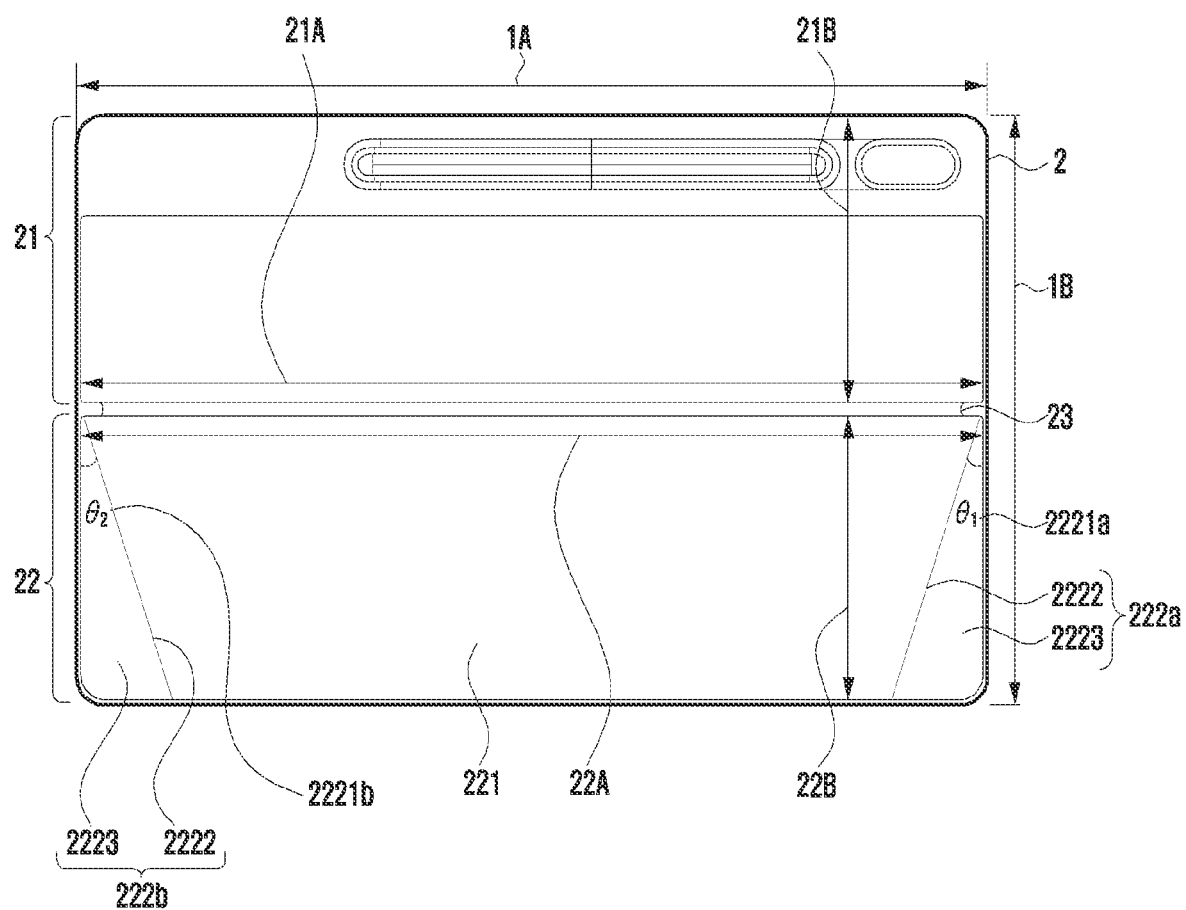
FIG. 2A is a plan view illustrating the rear surface of a cover 2 for the electronic device 101 capable of holding the electronic device 101 in landscape orientation and portrait orientation according to an embodiment of the disclosure.
Figure 2B:
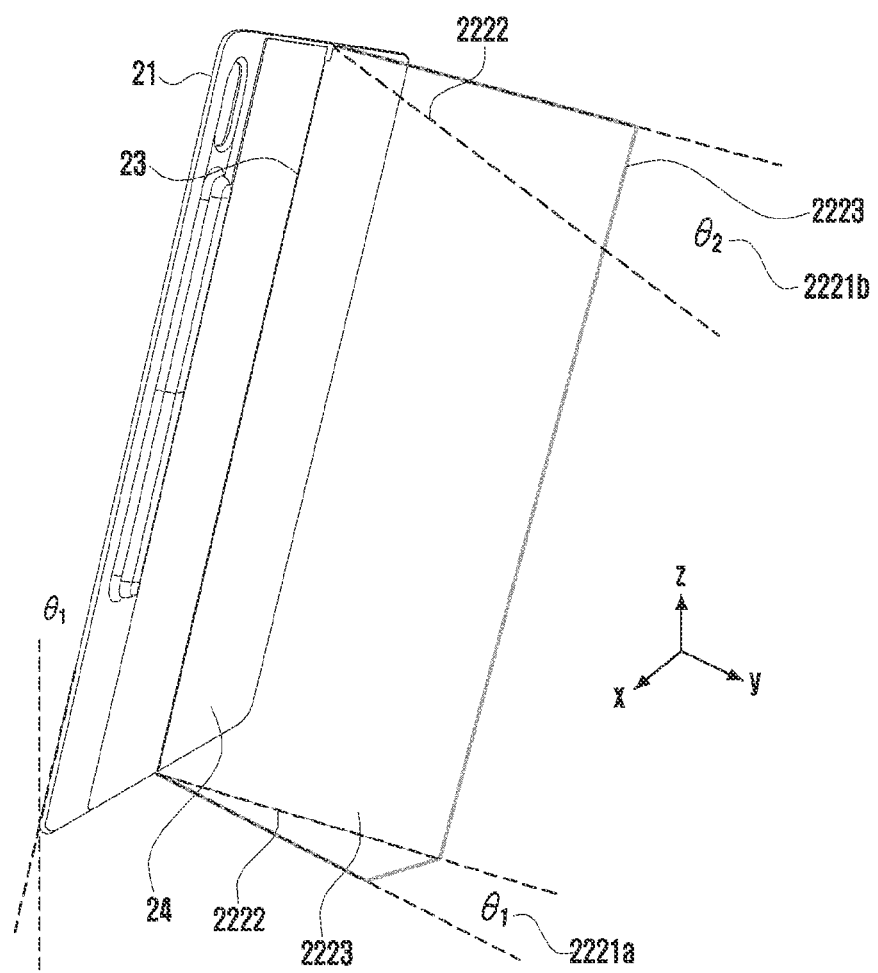
FIG. 2B is a perspective view of the cover 2 for the electronic device 101 placed in portrait orientation according to an embodiment of the disclosure.
Figure 2C:
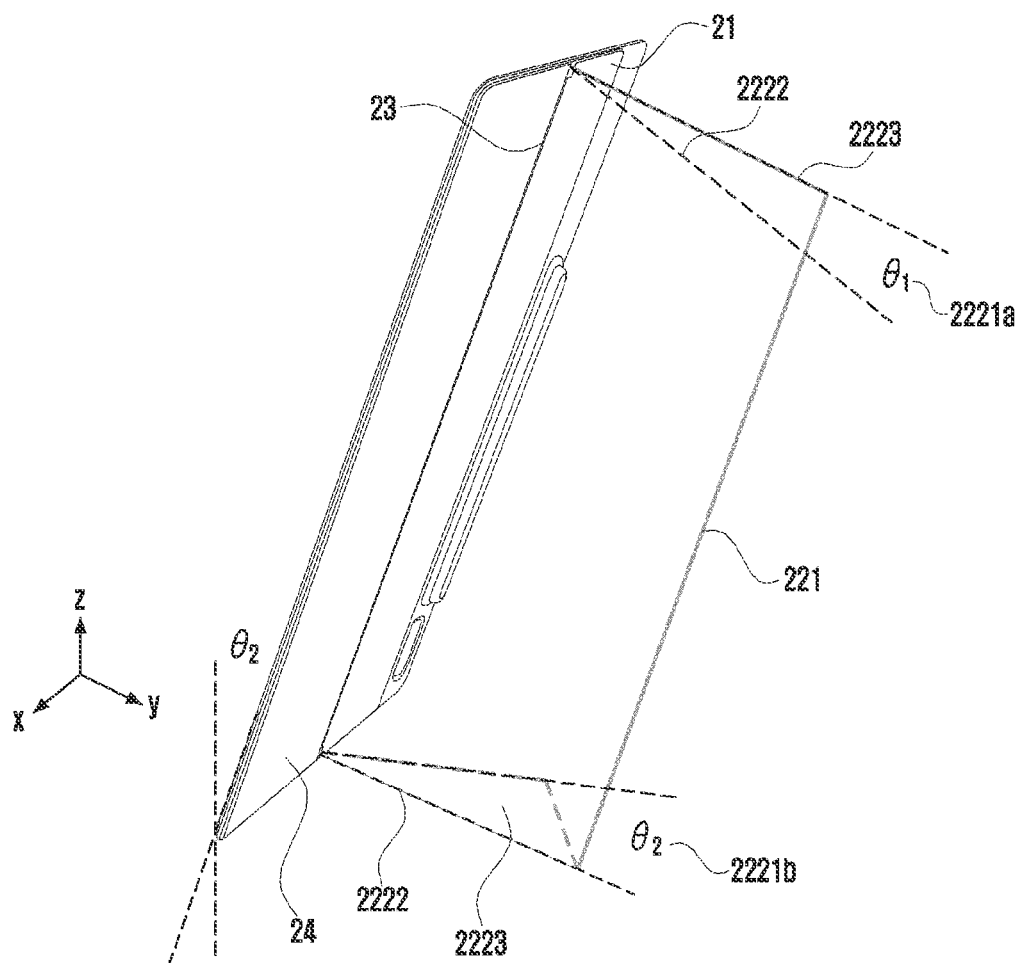
FIG. 2C is a perspective view of the cover 2 for the electronic device 101 placed in portrait orientation according to an embodiment of the disclosure.

FIG. 2A is a plan view illustrating the ear surface of a cover 2 for the electronic device 101 capable of holding the electronic device 101 in landscape orientation and portrait orientation according to an embodiment of the disclosure, and FIGS. 2B and 2C are perspective views of the cover 2 for the electronic device 101 placed in portrait orientation according to an embodiment of the disclosure. In FIGS. 2B and 2C, the x- and y-axis directions indicate directions parallel to the plane on which the electronic device 101 is mounted, and the z-axis direction indicates a direction perpendicular to the plane.

With reference to FIGS. 2A, 2B, and 2C, the cover 2 for the electronic device 101 (refer to FIG. 1) capable of holding the electronic device 101 in landscape orientation and portrait orientation according to an embodiment may include a first plate 21, a second plate 22, a hinge 23, and/or a third plate 24.

The cover 2 for the electronic device 101 capable of horizontally and vertically holding the electronic device 101 may have a suitable shape for protecting at least a portion of the electronic device 101. In various embodiments, the cover 2 for the electronic device 101 may be attached to the rear surface of the electronic device 101 through various attachment means. For example, the cover 2 for the electronic device 101 may have one of a magnet or a magnetic material, and may be coupled to another one of a magnet or a magnetic material located on the rear surface of the electronic device 101. In this embodiment, the third plate 24 may be magnetically coupled to the rear surface of the electronic device 101, and may protect the rear surface of the electronic device 101 when the second plate 22 is unfolded to support the electronic device 101. In other embodiments, the cover 2 for the electronic device 101 may be coupled to a case or pouch (not separately shown) for accommodating the electronic device 101. In this embodiment, the electronic device 101 may be placed within the case or pouch by using a suitable approach. For example, the case or pouch may have an opening through which the electronic device 101 is to be inserted. In some embodiments, the cover 2 for the electronic device 101 may have, at the back, an opening for exposing a sensor like a camera of the electronic device 101 and/or a pen holder for storing a stylus pen. The pen holder may have an openable and closable cover for protecting the stored stylus pen. The configuration of the cover for protecting the electronic device 101 is not limited thereto, and various known technologies related to the cover 2 for the electronic device 101 may be referred to.

The first plate 21 and the second plate 22 may be made of a suitable material capable of providing an appropriate level of protection to the electronic device 101 and supporting the electronic device 101 when the electronic device 101 is mounted. In some embodiments, the case may include a hard material to provide a high level of protection or a soft material to improve the user's tactile experience. In another embodiment, the cover 2 for the electronic device 101 may be composed by laminating different types of materials to achieve a desired level of protection and usage feeling. For example, the laminated structure may include a soft shell and a plate-shaped rigid member in contact with the inner surface of the outer shell. In some embodiments, the soft shells of the first plate 21 and the second plate 22 may be connected to each other, and the rigid members of the first plate 21 and the second plate 22 may be separate and distinct from each other. In this case, the hinge 23 may be positioned between the rigid members of the first plate 21 and the second plate 22 inside the inner surface of the portion where the first plate 21 and the second plate 22 having a soft shell are connected. In various embodiments, the rigid members may be made of ABS, HDPE, PP, PBT, PC, PS, MC Nylon, bakelite or similar synthetic resin, and may be made of fiber-reinforced plastic by combining a glass fiber or carbon fiber reinforcing material with the above synthetic resin if necessary. Further, if necessary, one or more additional layer(s) may be laminated on the outer surface of the shell to improve the external appearance.

The first plate 21 may be coupled to the rear surface of the electronic device 101 when the display of the electronic device 101 is in front. In some embodiments, the first plate 21 may have a first rectangular shape that has a long side 21A being substantially the same as the long side 1A of the electronic device 101 and covers a portion of the rear surface of the electronic device 101. The length of the short side 21B of the first plate 21 may be determined based on the short side 22B of the second plate 22 and the position of the first plate 21, which will be described later. The thickness of the first plate 21 may be equal to the sum of the thickness of the second plate 22 and the thickness of the third plate 24 at the pen holder.

The second plate 22 may have a second rectangular shape having a long side 22A corresponding to the long side 21A of the first plate 21 as a whole. The second plate 22 may be rotatably coupled to the first plate 21 through the hinge 23. The short side 22B of the second plate 22 may be long enough to stably hold the electronic device 101 in horizontal and vertical mounting. For example, the length of the short side 22B of the second rectangle may be ¼ or more of the length of the short side 1B of the electronic device 101. If the length of the short side 22B of the second rectangle is shorter than ¼ of the short side 1B of the electronic device 101, when the electronic device 101 is placed in landscape orientation, the center of gravity of the electronic device 101 is out of the range supported by the second plate 22, and the electronic device 101 may tip over backwards. In some embodiments, the lengths of short sides 21B and 22B, respectively, of the first plate 21 and the second plate 22 may be substantially the same; the length of the short side 22B of the second plate 22 may be substantially equal to ½ of the length of the short side 1B of the electronic device 101; and the hinge 23 may be positioned substantially on the center line of the electronic device 101. In this configuration, the center of gravity of the electronic device 101 does not deviate from the support range of the second plate 22 when mounted in landscape orientation, and the second plate 22 can support the electronic device 101 on the center line of the electronic device 101 when mounted in portrait orientation, which has the effect of improving stability when mounted in landscape orientation and portrait orientation.

The hinge 23 connects one of the long sides 21A of the first plate 21 and the long side 22A of the second plate 22 corresponding to the above long side 21A. The hinge 23 may rotate the second plate 22 relative to the first plate 21 through rotational action.

The hinge 23 may have resistance to rotational action at at least one rotational angle. When the electronic device 101 is mounted in landscape orientation, this resistance has an effect of preventing the electronic device 101 from tipping over backwards with respect to the direction of the display due to the folding of the second plate 22 about the hinge 23. In addition, when the electronic device 101 is mounted in portrait orientation, this resistance has an effect of preventing the electronic device 101 from tipping over sideways due to the folding of the second plate 22 about the hinge 23. A detailed configuration of the hinge 23 to have resistance to rotational action at at least one rotational angle will be described later.

The second plate 22 may include a main plate 221 in a trapezoidal shape having a corresponding long side as a base and in which at least one corner portion of the second rectangular shape is cut at a specific angle, and a folding part 222a formed to fold the corner portion at a specific angle. The folding part 222a may include a flap 2223 connected to the main plate 221 at a leg of the trapezoid and including a corner portion of the rectangular shape, and a fold line 2222 connecting the main plate 221 and the flap 2223 in a foldable manner.

In an embodiment, the main plate 221 and the flap 2223 of the second plate 22 may have a laminated structure. In some embodiments, the main plate 221 and the flap 2223 may each include a soft shell having flexibility and a plate-shaped rigid member having a shape corresponding to the main plate 221 or the flap 2223 and in contact with the inner surface of the soft shell. In this case, the fold line 2222, which is a portion connecting the main plate 221 and the flap 2223, may include a region where the plate-shaped rigid members are not positioned between the soft shells. Hence, the fold line 2222 may have flexibility, and thus the second plate 22 may be folded along the fold line 2222.

The fold line 2222 makes a specific mounting angle 2221a or 2221b with the short side of the second plate 22; when the electronic device 101 is mounted in portrait orientation so that the fold line 2222 is in contact with the mounting surface in a state where the second plate 22 is unfolded and the flap 2223 is folded, as the electronic device 101 is mounted at a specific mounting angle 2221a or 2221b, the risk of tipping over is reduced.

In some embodiments, the second plate 22 may have a plurality of folding parts 222a and 222b connected respectively to two opposite legs of the main plate 221 (refer to FIG. 2A). In this case, the first foldable part 222a may be folded at a first mounting angle 2221a, and the second folding part 222b may be folded at a second mounting angle 2221b. As shown in FIGS. 2B and 2C, since the second plate 22 has two folding parts 222a and 222b capable of being folded at different mounting angles 2221a (refer to FIG. 2C) and 2221b (refer to FIG. 2B), the cover 2 for the electronic device 101 can hold the electronic device 101 at different mounting angles 2221a and 2221b when mounted in a portrait orientation; hence, the electronic device 101 can be held in a posture more suitable for different usage environments, so that user convenience may be enhanced. In some embodiments, when the electronic device 101 is mounted in portrait orientation, the mounting angle 2221a or 2221b may be set so that the center of gravity of the electronic device 101 does not deviate from a range supported by the second plate 22. For example, when the length of the short side 22B of the second plate is substantially equal to half the length of the short side 1B of the electronic device 101, the mounting angle 2221a or 2221b may be determined by Equation 1 below.

$$\frac{S}{\cos\theta} \geq L\sin\theta \qquad \text{[Equation 1]}$$

In Equation 1, S indicates the length of the short side 1B of the electronic device 101, L indicates the length of the long side 1A of the electronic device 101, and θ is a mounting angle 2221a or 2221b. When the mounting angle 2221a or 2221b is out of the range of the above inequality the electronic device 101 may tip over backwards, as the center of gravity of the electronic device 101, which is usually located at the center of the electronic device 101, will be out of the range supported by the folding parts 222a and 222b during portrait-oriented mounting.

Figure 3A:
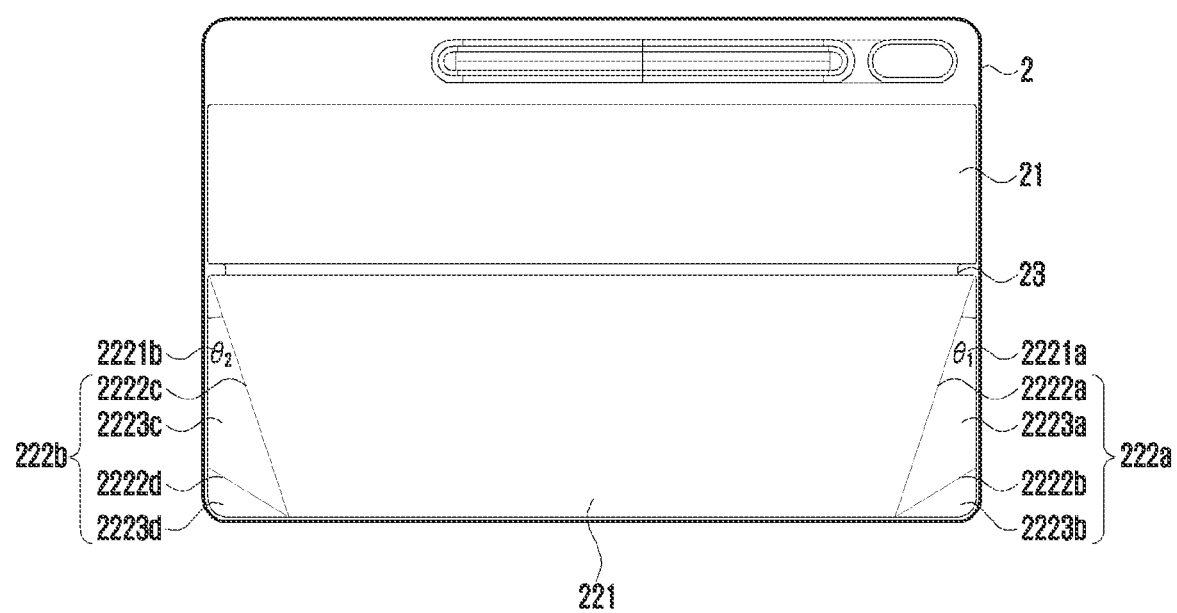
FIG. 3A is a plan view illustrating the rear surface of a cover 2 for the electronic device 101 according to another embodiment of the disclosure.
Figure 3B:
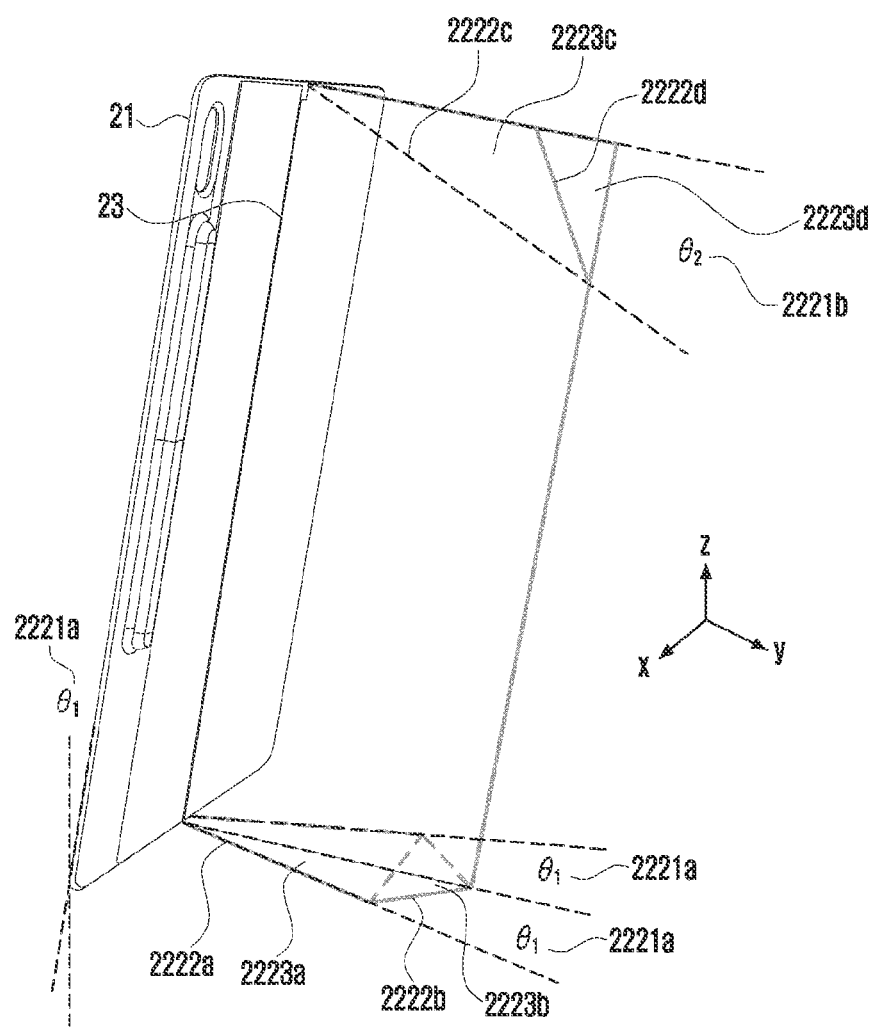
FIG. 3B is a perspective view of the cover 2 for the electronic device 101 placed in portrait orientation according to another embodiment of the disclosure.
Figure 3C:
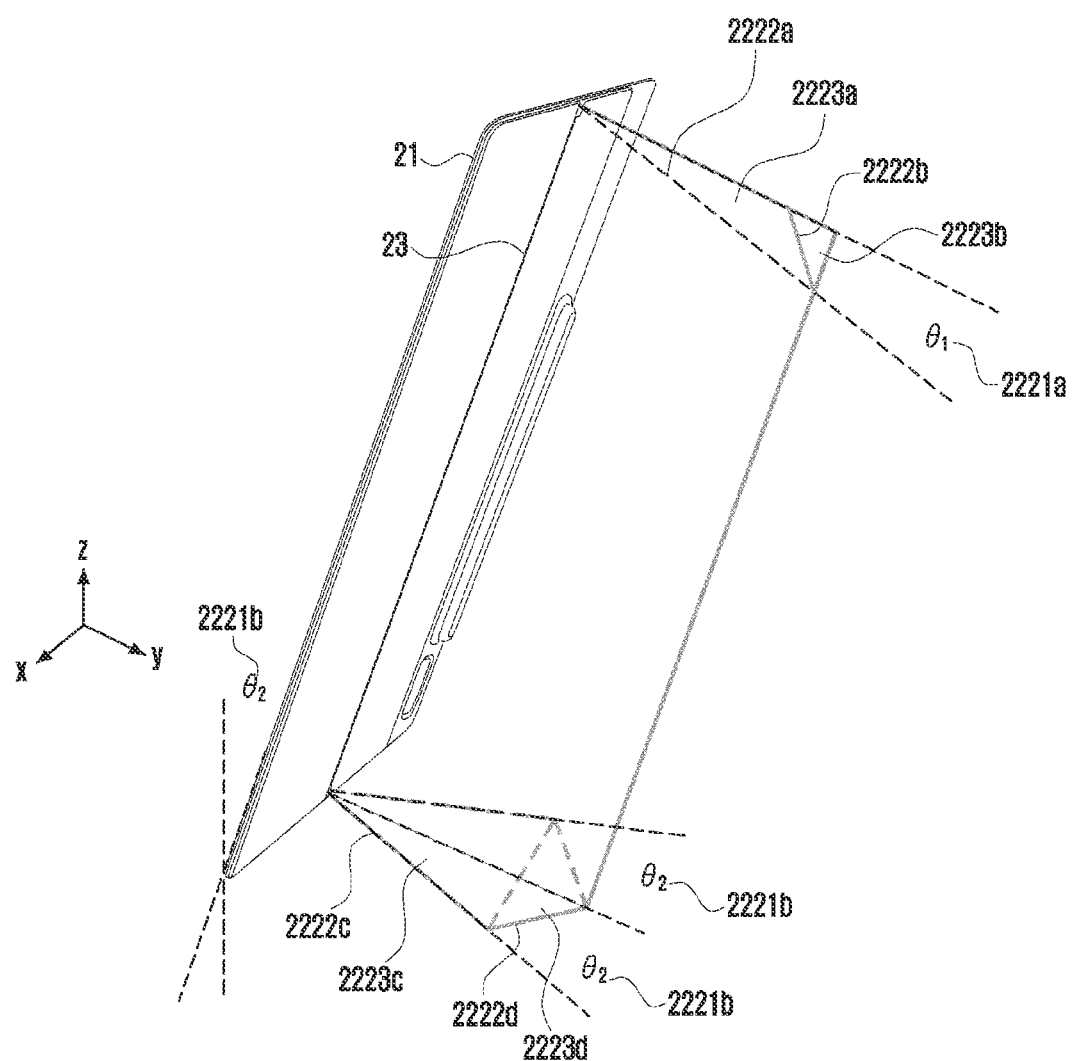
FIG. 3C is a perspective view of the cover 2 for the electronic device 101 placed in portrait orientation according to another embodiment of the disclosure.

FIG. 3A is a plan view illustrating the rear surface of a cover 2 for the electronic device 101 according to another embodiment of the disclosure. FIGS. 3B and 3C are perspective views of the cover 2 for the electronic device 101 placed in portrait orientation according to another embodiment of the disclosure. In FIGS. 3B and 3C, the x and y-axis directions represent directions parallel to the plane on which the electronic device 101 is mounted, and the z-axis direction represents a direction perpendicular to the above plane.

With reference to FIG. 3A, a first folding part 222a of the second plate 22 may include a first fold line 2222a, a plurality of first flaps 2223a, a plurality of second fold lines 2222b, and/or a plurality of second flaps 2223b; and a second folding part 222b may include a first fold line 2222c, a plurality of first flaps 2223c, a plurality of second fold lines 2222d, and a plurality of second flaps 2223d.

With reference to FIG. 3A, in various embodiments of the disclosure, the first folding part 222a of the second plate 22 may include a first fold line 2222a, a plurality of first flaps 2223a whose one side is connected to a leg of the main plate 221 through the first fold line 2222a and facing each other, a second fold line 2222b connected to the other side of the first flap 2223a, and a plurality of second flaps 2223b connected to the first flaps 2223a through the second fold line 2222b and facing each other. In some embodiments, sides of the second flap 2223b that are not connected to the first flaps 2223a may be connected to each other.

With reference to FIGS. 3B and 3C, due to the above configuration, the folding part 222a of the second plate 22 according to one embodiment may be folded in a squash fold state (also referred to as a partially collapsed fold state). The squash fold refers to formation of a mounting surface perpendicular to the main plate 221 by folding the first folding part 222*a* in a manner that two first flaps 2223*a* are folded outwards with respect to both side surfaces of the second plate 22 and two second flaps 2223*b* are folded inwards. The second flap may have a smaller size than the first flap. In this case, when the folding part 222*a* is folded in a squash fold, the inner surface of the first flap 2223*a* and the outer surface of the second flap 2223*b* may be exposed to the mounting surface. Regarding the second folding part 222*b*, reference may be made to the description of the first folding part 222*a* within a range that is not contradictory.

Figure 4:
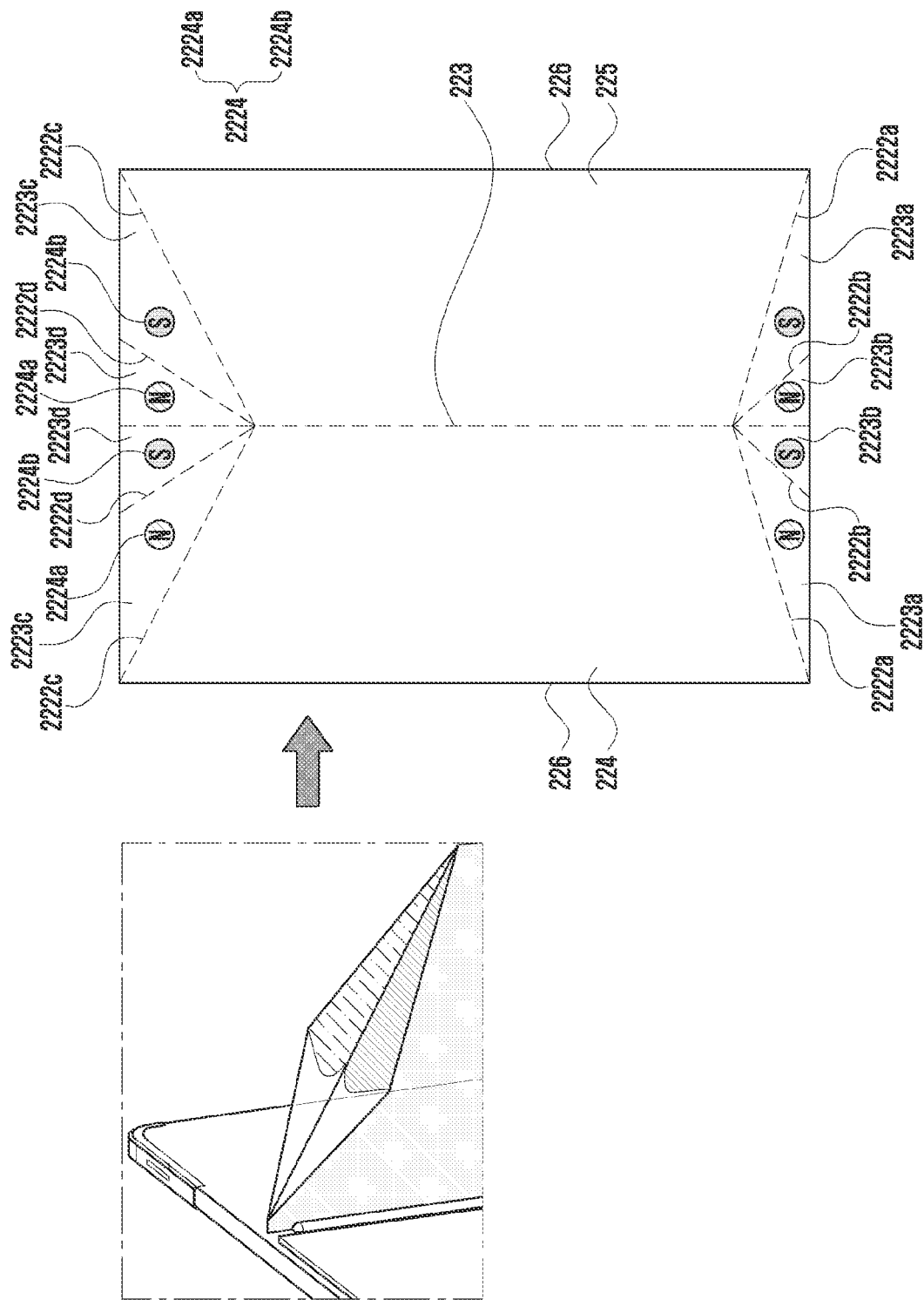
FIG. 4 is a development view of a second plate 22 according to some embodiments.

FIG. 4 is a development view of the second plate 22 according to some embodiments.

With reference to FIG. 4, the second plate 22 according to some embodiments may have a second rectangular shape having a two-layer structure formed by folding a rectangular plate as a whole. The second plate may have a folding line 223 formed by folding the rectangular plate, and a first surface 224 and a second surface 225 facing each other. When the electronic device 101 is mounted in landscape orientation, the folding line 223 may become a region supporting the electronic device 101, and two long sides of the rectangular plate parallel to the folding line 223 may overlap each other to become a region 226 coupled to the hinge 23. The main plate 221 may be formed by bonding two trapezoidal parts of the first surface 224 and the second surface 225 to each other, and the folding parts 222*a* and 222*b* may be made of parts of the first surface 224 and the second surface 225 that are not bonded. For the bonding of the first surface 224 and the second surface 225, known bonding techniques suitable for the material of the plate, such as fusion by heat, pressure or friction, welding, bonding by adhesive, or the like, may be referred to.

In various embodiments, the foldable parts 222*a* and 222*b* may include a detachable coupling member 2224 for maintaining a squash fold state. The detachable coupling member 2224 may be disposed so that a region where the plural first flaps 2223*a* and 2223*c* and the plural second flaps 2223*b* and 2223*d* overlap is exposed when making a squash fold, on the inner surface with respect to the folding line 223 of the rectangular plate. The detachable coupling member 2224 may be a removable adhesive, a magnet, a magnet and a magnetic material, or a hook and loop fastener. The detachable coupling member 2224 may include a first coupling member and/or a second coupling member.

The second coupling member may correspond to the first coupling member and may be detachably coupled with the first coupling member. In an embodiment, when the detachable coupling member 2224 is made of one or more magnets, as shown in FIG. 4, the first coupling member may be a magnet 2224*a* arranged with its N pole facing the surface and the second coupling member may be a magnet 2224*b* arranged with its S pole facing the surface. In another embodiment, when the detachable coupling member 2224 is a magnet and a magnetic material, the first coupling member may be a magnet and the second coupling member may be a magnetic material. In another embodiment, when the detachable coupling member 2224 is a hook and loop fastener, the first coupling member may be a hook and the second coupling member may be a loop.

With reference to FIG. 4, the first coupling member and the second coupling member may be alternately positioned on the inner surface of the first flap 2223*a* or the second flap 2223*b*. In this case, as shown in FIG. 4, due to the symmetry of the folding parts 222*a* and 222*b*, the first coupling member of the first flap 2223*a* and the second coupling member of the second flap 2223*b* may be coupled in a squash fold state, so that the first flap 2223*a* and the second flap 2223*b* are coupled to each other. Further, in the state where the squash fold is released, the first coupling member and the second coupling member provided respectively to the two first flaps 2223*a* may be coupled to each other, and the second coupling member and the first coupling member provided respectively to the two second flaps 2223*b* may be coupled to each other.

The configuration of the detachable coupling member 2224 described above has an effect of providing a coupling force for maintaining the state where a squash fold is made or released. In addition, this configuration has a wide mounting surface formed by coupling between plural first flaps and plural second flaps in a squash fold state, which provides additional stability of preventing the electronic device 101 mounted in portrait orientation from tipping over sideways. The detachable coupling member 2224 may prevent movement between the first flap 2223*a* and the second flap 2223*b* in a squash fold state to thereby provide resistance against the inclination of the mounting surface with respect to the second plate 22, which may further have an effect of preventing the electronic device 101 mounted in portrait orientation from tipping over sideways.

FIGS. 5A, 5B, 5C, and 5D are cross-sectional and perspective views of the hinge 23 according to an embodiment of the disclosure.

Figure 5A:
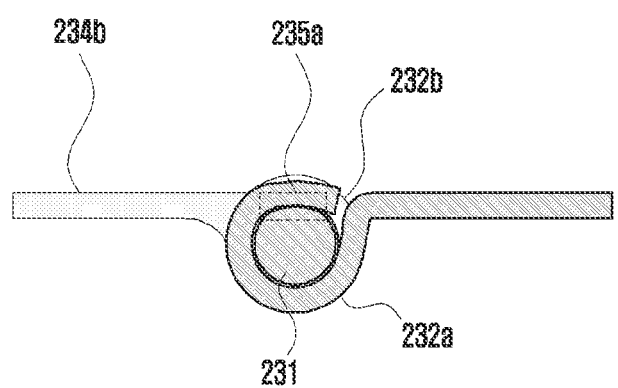
FIG. 5A is cross-sectional and perspective views of a hinge 23 according to an embodiment of the disclosure.
Figure 5B:
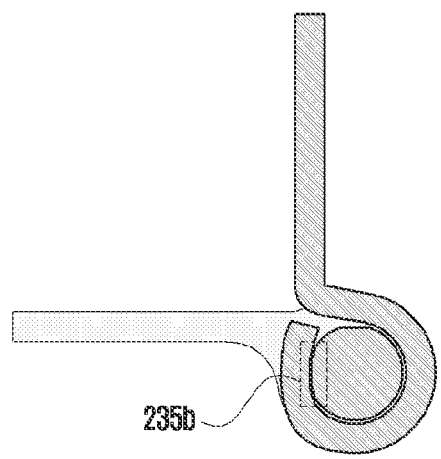
FIG. 5B is cross-sectional and perspective views of a hinge 23 according to an embodiment of the disclosure.
Figure 5C:
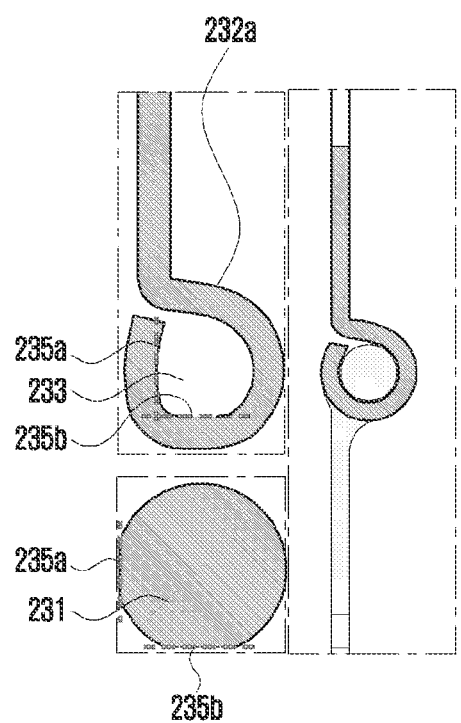
FIG. 5C is cross-sectional and perspective views of a hinge 23 according to an embodiment of the disclosure.
Figure 5D:
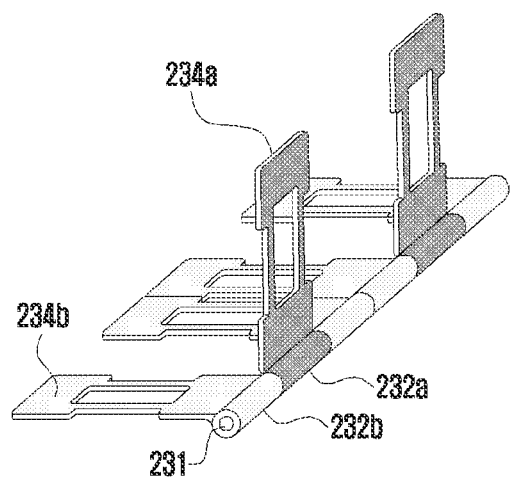
FIG. 5D is cross-sectional and perspective views of a hinge 23 according to an embodiment of the disclosure.

With reference to FIG. 5D, the hinge 23 may include a hinge shaft 231, hinge knuckles 232*a* and 232*b*, and/or a plurality of leaves 234*a* and 234*b*.

The hinge shaft 231 may have a cross-sectional shape suitable for rotation of the hinge. In some embodiments, the hinge shaft 231 may have a circular cross-section or a portion of a circle as a cross-section on the whole. The material of the hinge shaft 231 may be selected from known materials having appropriate mechanical properties, such as metal, synthetic resin, and fiber-reinforced synthetic resin.

The plurality of leaves 234*a* and 234*b* may be a first leaf 234*a* connected to one of the first plate 21 and the second plate 22, and a second leaf 234*b* connected to the other one of the first plate 21 and the second plate 22. Regarding the technical means for connecting the leaves 234*a* and 234*b* and the first and second plates 21 and 22, adhesion, welding, brazing, bolting, riveting or similar known joining techniques may be referred to. At least some of the plurality of leaves may be rotated about the hinge shaft 231. With reference to FIG. 5, in some embodiments, the first leaf 234*a* and the second leaf 234*b* may be rotatably coupled to the hinge shaft through the hinge knuckles 232*a* and 232*b*, which will be described later, respectively. Although not shown, in another embodiment, one of the first leaf 234*a* and the second leaf 234*b* may be fixedly coupled to the hinge shaft 231 through the hinge knuckle 232*a* or 232*b*, and the other one of the first leaf 234*a* and the second leaf 234*b* may be rotatability coupled to the hinge shaft through the hinge knuckle 232*a* or 232*b*.

The hinge knuckle 232*a* or 232*b* may be formed to surround the hinge shaft 231 in the circumferential direction, may have a shaft hole 233 passing the hinge shaft 231, and may be connected to at least some of the plurality of leaves 234*a* and 234*b*. In some embodiments, the hinge knuckles 232*a* and 232*b* may be a first hinge knuckle 232*a* coupled to the first leaf 234*a* and a second hinge knuckle 232*b* coupled to the second leaf 234*b*. The hinge knuckle 232*a* or 232*b* may wrap the whole or part of the hinge shaft 231. When the hinge shaft 231 has a circle or a part of a circle as a cross-sectional shape, the hinge knuckles 232*a* and 232*b* may wrap at least half of the circumference including the cross-sectional shape of the hinge shaft 231.

In some embodiments, the first leaf 234a and the second leaf 234b extend radially from the hinge knuckles 232a and 232b and are connected to the first plate 21 and the second plate 22, respectively. In some embodiments, the hinge knuckles 232a and 232b may be integrally molded with the leaves 234a and 234b, respectively. For example, the first hinge knuckle 232a and the first leaf 234a may be integrally molded by curling molding a single plate-shaped material so that one end thereof wraps the hinge shaft 231 in the circumferential direction (refer to FIG. 5A). The second hinge knuckle 232b and the second leaf 234b may also be integrally molded as described above (refer to FIG. 5B).

The hinge 23 may have resistance to rotational action at at least one rotational angle. In some embodiments, the hinge 23 may be a friction hinge, a torque hinge, or a free stop hinge, which has resistance to rotational action at all rotational angles. In some embodiments, the hinge knuckle 232a or 232b may have an elastic material, and the diameter of the shaft hole 233 formed in the hinge knuckle 232a or 232b may be slightly smaller than the diameter of the hinge shaft 231 in a state where the hinge shaft 231 is not combined (refer to FIG. 5C), in which case the elastic force of the material of the hinge knuckle 232a or 232b may serve as a force that tightens the hinge knuckle 232a or 232b with respect to the hinge shaft 231 to thereby generate a frictional force that resists the rotational action of the hinge 23. In another embodiment, the hinge 23 may further include a spring member that resists the rotational action of the hinge 23 by applying stress to the hinge knuckles 232a and 232b, through which the same hinge shaft 231 passes, in the direction of the hinge shaft 231 and generating a frictional force between the hinge knuckles 232a and 232b. The above-described embodiment is illustrative and does not limit the disclosure, and known techniques related to the hinge 23 suitable for holding the electronic device 101 may be referred to in order to achieve the object of the disclosure.

In an embodiment, the hinge 23 may be a detent hinge having detent characteristics where the resistance to rotational action is increased at at least one specific rotational angle. With reference to FIG. 5C, in various embodiments, the cross sections of the hinge shaft 231 and the shaft hole 233 may have a D-cut shape 235a or 235b being a shape cut along at least one chord from a circle. In the hinge shaft 231 and the shaft hole 233 having D-cut shapes 235a and 235b, the resistance to rotational action may be increased at a rotational angle where the chord of the hinge shaft 231 and the chord of the shaft hole 233 coincide. In some embodiments, the hinge shaft 231 and the shaft hole 233 may have a first D-cut shape 235a and a second D-cut shape 235b, respectively. The first D-cut shape 235a and the second D-cut shape 235b may have a constant angular displacement therebetween. This angular displacement may be the same as an ideal unfolding angle for mounting the electronic device 101 in landscape orientation or portrait orientation, and may be, for example, 90 degrees. In this case, the first D-cut shape 235a and the second D-cut shape 235b may provide resistance to rotation when the first leaf 234a and the second leaf 234b are horizontal with respect to each other and when the first leaf 234a and the second leaf 234b are perpendicular to each other, respectively. Therefore, stability can be provided for two cases where the second plate 22 is in a folded state for storage and where the second plate 22 is in an unfolded state for supporting the electronic device 101.

In another embodiment, the hinge shaft 231 may have a cross-sectional shape of a polygon or filleted polygon, and the shaft hole 233 formed in the hinge knuckle 232a or 232b may have a preset tolerance with the hinge shaft 231 and have a cross-sectional shape corresponding to the shape of a polygon or filleted polygon. In this embodiment, the hinge 23 may provide resistance to rotation at a plurality of rotational angles equal to the number of sides of the polygon.

In another embodiment, the hinge 23 may include a cam having a profile configured to have high resistance to rotation at at least one angle, and an elastic member pressing the cam. In some embodiments, the cam may be a single-sided cam, a cylindrical cam, a conical cam, a spherical cam, or a swash plate cam, but the disclosure is not limited thereto, and various known detent hinge configurations for adding detent characteristics to the hinge 23 of the electronic device may be referred to.

In the case of unfolding the second plate 22, the detent characteristics of the hinge 23 may allow the second plate 22 to be fixed in a state where the unfolding angle most suitable for mounting the electronic device 101 is reached. In an embodiment, when the second plate 22 is unfolded 90 degrees from the rear surface of the electronic device 101, the resistance to rotation of the hinge 23 may be maximized. In another embodiment, the hinge 23 may be configured to have resistance to rotation even when the second plate 22 is folded parallel to the rear surface of the electronic device 101. The hinge 23 having detent characteristics is effective for preventing the second plate 22 from being overturned due to folding when the electronic device 101 is mounted in landscape orientation or portrait orientation. Further, if the user unfolds the second plate 22, when the optimal angle for holding the electronic device 101 is reached, tactile feedback may be given to the user to recognize it, which has an effect of improving user convenience by enabling the user to easily unfold the second plate 22 at an optimal angle. As used herein, an "optimal" angle refers to an angle of maximum rotational resistance based on the detect characteristics of a respective embodiment.

According to various embodiments, it is possible to implement an electronic device 101 capable of being mounted in landscape orientation and portrait orientation. In some embodiments, the electronic device 101 that can be mounted in landscape orientation and portrait orientation may include: a first plate 21 positioned on a rear surface part of the electronic device 101; a hinge 23 connected to the first plate 21 and configured to have resistance to rotation at at least one rotational angle; and a second plate 22 having a substantially rectangular shape and rotatably connected to the first plate 21 through the hinge 23, wherein the second plate 22 may include a trapezoidal main plate 221 having a side of the second plate 22 connected to the hinge 23 as a base, and at least one folding part 222a or 222b connected to the main plate 221 and being foldable in a surface direction of the second plate 22 at a specific angle with respect to the short side of the second plate 22. In this embodiment, the electronic device 101 can be independently mounted in landscape orientation and portrait orientation without using a cradle or a holder and cover, in which case the second plate 22 serves as a cradle or a kick stand.

In some embodiments, the folding part 222a or 222b may include a flap 2223, and a fold line 2222 formed to connect the main plate 221 and the flap 2223 in a foldable manner and have a specific angle with the short side of the main plate 221. The first plate 21 and the second plate 22 may be made of a material suitable for manufacturing the housing of the electronic device 101, such as metal, glass, synthetic resin, or fiber-reinforced synthetic resin. In some embodiments, the fold line 2222 may include the hinge 23; in another embodiment, the fold line 2222 may include a synthetic resin material having flexibility. Regarding the configurations of the first plate 21, the second plate 22, and the folding part 222a or 222b, reference can be made to the description of the cover 2 for the electronic device 101 of the disclosure described above within a range that is not contradictory.

In some embodiments, the first folding part 222a may include two layers of flaps 2223, and each of the flaps 2223 may be connected to the main plate 221 through the folding parts 222a so as to be foldable in an outward direction with respect to both surfaces of the second plate 22. In another embodiment, the folding part 222a may include two layers of first flaps 2223a, a first fold line 2222a connecting the first flaps 2223a to the main plate 221 in a foldable manner, two layers of second flaps 2223b connected respectively to the first flaps 2223a, and a second fold line 2222b connecting the second flaps 2223b to the first flaps 2223a in a foldable manner, wherein when the electronic device 101 is mounted in portrait orientation, the first flaps 2223a are folded in an outward direction with respect to both surfaces of the second plate 22, and the second flaps 2223b are folded in an inward direction, making a squash fold. Regarding the structure in which the first folding part 222a and the second folding part 222b make a squash fold, reference can be made to the description of the folding parts 222a and 222b of the cover 2 for the electronic device 101 described above within a range that is not contradictory.

In some embodiments, the folding part 222a may include a detachable coupling member 2224 for coupling the first flaps 2223a and the second flaps 2223b. The detachable coupling member 2224 may be, for example, a removable adhesive, a magnet, a magnet and a magnetic material, or a hook and loop fastener. Regarding the detailed configuration of the detachable coupling member 2224, reference may be made to the description of the detachable coupling member 2224 of the cover 2 for the electronic device 101 of the disclosure described above within a range that is not contradictory.

In some embodiments, the second plate 22 has a two-layer structure formed by folding a plate, wherein the main plate 221 may be made of parts where the two-layer structure is bonded to each other and the folding part 222a may be made of parts that are not bonded in the two-layer structure. Regarding the two-layer structure of the second plate 22, reference can be made to the description of the second plate 22 of the cover 2 for the electronic device 101 of the disclosure described above within a range that is not contradictory.

In some embodiments, the hinge 23 may be a torque hinge (or, friction hinge, free stop hinge). In another embodiment, the hinge 23 may be a detent hinge. For a detent hinge, the hinge shaft 231 and the shaft hole 233 may have a D-cut shape 235. Regarding the torque hinge, the detent hinge and the D-cut shape 235, reference may be made to the description of the hinge 23 of the cover 2 for the electronic device 101 of the disclosure described above within a range that is not contradictory.

A cover for an electronic device according to various embodiments of the disclosure may include: a first plate, a hinge connected to the first plate and configured to have resistance to rotation at at least one rotational angle; and a second plate having a substantially rectangular shape and having one side rotatably connected to the first plate through the hinge. The second plate may include a trapezoid-shaped main plate having the side of the second plate connected to the hinge as a base, and a folding part connected to the main plate and being foldable in a surface direction of the second plate while forming a specific angle with the short side of the second plate.

In other embodiments, the folding part may include a flap, and a fold line connecting the main plate and the flap in a foldable manner and forming a specific angle with respect to the short side of the main plate. In other embodiments, the folding part may include two layers of flaps, and each of the flaps may be connected to the main plate by the fold line so as to be foldable in an outward direction with respect to both surfaces of the second plate.

In other embodiments, the folding part may include two layers of first flaps, a first fold line connecting each of the first flaps to the main plate in a foldable manner, two layers of second flaps connected respectively to the first flaps, and a second fold line connecting the second flaps to the first flaps in a foldable manner. When the electronic device is mounted in portrait orientation, the first flaps are folded in an outward direction with respect to both surfaces of the second plate, and the second flaps are folded in an inward direction, making a squash fold. In some embodiments, the second plate may have a two-layer structure formed by folding a plate, parts of the two-layer structure may be bonded to each other, and the folding part may be made of parts that are not bonded in the two-layer structure.

In some embodiments, the cover for the electronic device may include a detachable coupling member 2224 for coupling the first flaps and the second flaps. In some embodiments, the detachable coupling member 2224 may include magnets, and the magnets may be disposed on surfaces of the first flaps and the second flaps in contact with each other such that the N pole and the S pole face each other.

In some embodiments, the hinge may be a torque hinge that provides a frictional force against rotation of the hinge. In other embodiments, the hinge may be a detent hinge having characteristics where the resistance to rotational action is increased at at least one specific rotational angle. In other embodiments, the detent hinge may include a hinge shaft and a hinge knuckle having a shaft hole through which the hinge shaft passes, and the hinge shaft and the shaft hole may each have a cross section of a D-cut shape being a shape cut along at least one chord from a circle, so that the resistance to rotational action may be increased at a rotational angle of the hinge where the chord of the hinge shaft and the chord of the shaft hole coincide.

An electronic device capable of being mounted in landscape orientation and portrait orientation according to other embodiments of the disclosure may include: a first plate positioned on a rear surface part of the electronic device; a hinge connected to the first plate and configured to have resistance to rotation at at least one rotational angle; and a second plate having a substantially rectangular shape and rotatably connected to the first plate through the hinge. In some embodiments, the second plate may include a trapezoidal main plate having a side of the second plate connected to the hinge as a base, and a folding part connected to the main plate and being foldable in a surface direction of the second plate at a specific angle with respect to the short side of the second plate. In some embodiments, the folding part may include a flap, and a fold line formed to connect the main plate and the flap in a foldable manner and have a specific angle with the short side of the main plate. In some embodiments, the folding part may include two layers of flaps, and each of the flaps may be connected to the main plate through the folding part so as to be foldable in an outward direction with respect to both surfaces of the second plate.

In other embodiments, the folding part may include two layers of first flaps, a first fold line connecting the first flaps to the main plate in a foldable manner, two layers of second flaps connected respectively to the first flaps, and a second fold line connecting the second flaps to the first flaps in a foldable manner. When the electronic device is mounted in portrait orientation, the first flaps are folded in an outward direction with respect to both surfaces of the second plate, and the second flaps are folded in an inward direction, making a squash fold. In some embodiments, the second plate may have a two-layer structure formed by folding a plate, parts of the two-layer structure may be bonded to each other, and the folding part may be made of parts that are not bonded in the two-layer structure.

In some embodiments, the electronic device may include a detachable coupling member 2224 for coupling the first flaps and the second flaps. In some embodiments, the detachable coupling member 2224 may include magnets, and the magnets may be disposed on surfaces of the first flaps and the second flaps in contact with each other such that the N pole and the S pole face each other.

In some embodiments, the hinge may be a torque hinge that provides a frictional force against rotation of the hinge. In other embodiments, the hinge may be a detent hinge having characteristics where the resistance to rotational action is increased at at least one specific rotational angle. In other embodiments, the detent hinge may include a hinge shaft and a hinge knuckle having a shaft hole through which the hinge shaft passes, and the hinge shaft and the shaft hole may each have a cross section of a D-cut shape being a shape cut along at least one chord from a circle, so that the resistance to rotational action may be increased at a rotational angle of the hinge where the chord of the hinge shaft and the chord of the shaft hole coincide.

Meanwhile, the embodiments of this document disclosed in the specification and drawings are presented as specific examples to easily explain the technical content of the embodiments disclosed in this document and help understanding of the embodiments disclosed in this document, and are not intended to limit the scope of the embodiments disclosed herein. Therefore, the scope of various embodiments disclosed in this document should be construed as including not only those embodiments disclosed in this document but also all changes or modifications derived based on the technical ideas of the embodiments disclosed herein.

The invention claimed is:

1. A cover for an electronic device capable of holding the electronic device in both a landscape orientation and a portrait orientation, the cover comprising:
   a first plate;
   a hinge connected to the first plate and configured to have resistance to rotation at at least one rotational angle, wherein the hinge comprises a hinge shaft and a hinge knuckle having a shaft hole through which the hinge shaft passes, and the hinge shaft and the shaft hole each have a cross section of a D-cut shape being a shape cut along at least one chord from a circle; and
   a second plate having one side rotatably connected to the first plate through the hinge,
   wherein the second plate includes a trapezoid-shaped main plate having a side connected to the hinge as a base, and a folding part connected to the main plate, the folding part being foldable along a fold line while forming a specific angle with a short side of the second plate.

2. The cover for an electronic device of claim 1, wherein the folding part includes a flap, and the fold line connects the main plate and the flap in a foldable manner to define the specific angle with respect to the short side of the main plate.

3. The cover for an electronic device of claim 1, wherein:
   the folding part includes two layers of first flaps, a first fold line connecting each of the first flaps to the main plate in a foldable manner, two layers of second flaps connected respectively to the first flaps, and a second fold line connecting the second flaps to the first flaps in a foldable manner; and
   in case that the electronic device is mounted in portrait orientation, the first flaps are folded in an outward direction with respect to both surfaces of the second plate, and the second flaps are folded in an inward direction, making a squash fold.

4. The cover for an electronic device of claim 3, wherein the second plate has a two-layer structure formed by folding a plate, parts of the two-layer structure are bonded to each other, and the folding part is made of parts that are not bonded in the two-layer structure.

5. The cover for an electronic device of claim 3, comprising a coupling member for detachably coupling the first flaps and the second flaps.

6. The cover for an electronic device of claim 1, wherein the hinge includes at least one of a torque hinge that provides a frictional force against rotation of the hinge or a detent hinge having characteristics where resistance to rotational action is increased at at least one specific rotational angle.

7. An electronic device capable of being held in both a landscape orientation and a portrait orientation, comprising:
   a first plate positioned on a rear surface part of the electronic device;
   a hinge connected to the first plate and configured to have resistance to rotation at at least one rotational angle, wherein the hinge comprises a hinge shaft and a hinge knuckle having a shaft hole through which the hinge shaft passes, and the hinge shaft and the shaft hole each have a cross section of a D-cut shape being a shape cut along at least one chord from a circle; and
   a second plate rotatably connected to the first plate through the hinge,
   wherein the second plate includes a trapezoid-shaped main plate having a side connected to the hinge as a base, and a folding part connected to the main plate, the folding part being foldable along a fold line while forming a specific angle with respect to a short side of the second plate.

8. The electronic device of claim 7, wherein the folding part includes two layers of flaps, and respective fold lines connecting the main plate and the two layers of flaps are configured to be foldable in an outward direction with respect to both surfaces of the main plate and to have a specific angle with a short side of the main plate.

9. The electronic device of claim 7, wherein:
   the folding part includes two layers of first flaps, a first fold line connecting the first flaps to the main plate in a foldable manner, two layers of second flaps connected respectively to the first flaps, and a second fold line connecting the second flaps to the first flaps in a foldable manner; and
   in case that the electronic device is mounted in portrait orientation, the first flaps are folded in an outward direction with respect to both surfaces of the second plate, and the second flaps are folded in an inward direction, making a squash fold.

10. The electronic device of claim 9, wherein the second plate has a two-layer structure formed by folding a plate, parts of the two-layer structure are bonded to each other, and the folding part is made of parts that are not bonded in the two-layer structure.

11. The electronic device of claim 9, comprising a coupling member for detachably coupling the first flaps and the second flaps.

12. The electronic device of claim 7, wherein the hinge includes at least one of a torque hinge that provides a frictional force against rotation of the hinge or a detent hinge having characteristics where resistance to rotational action is increased at at least one specific rotational angle.

* * * * *